(12) United States Patent
Clement et al.

(10) Patent No.: US 6,833,525 B1
(45) Date of Patent: Dec. 21, 2004

(54) RELEASING OF GLAZING PANELS (75) Inventors: Robert Marc Clement, Pontardawe (GB); Christopher Davies, Dyfed (GB); Michael Noel Kiernan, Seven Sisters (GB)

(73) Assignee: Carglass Luxembourg Sarl-Zug Branch, Zug (CH)

( * ) Notice: Subject to any disclaimer, the term of this patent is extended or adjusted under 35 U.S.C. 154(b) by 0 days.

(21) Appl. No.: 09/346,375

(22) Filed: Jul. 1, 1999

Related U.S. Application Data (63) Continuation-in-part of application No. 09/184,186, filed on Nov. 2, 1998, which is a continuation-in-part of application No. 09/133,854, filed on Aug. 14, 1998, which is a continuation of application No. 08/693,060, filed on Aug. 13, 1996.

(30) Foreign Application Priority Data

Aug. 11, 1998 (GB) ............................................. 9817441

(51) Int. Cl.[7] ............................................. B23K 26/00
(52) U.S. Cl. ............................. 219/121.61; 219/121.85; 219/121.6
(58) Field of Search ........................ 219/121.61, 121.85, 219/121.6, 121.65, 121.66, 121.73; 156/272.8, 344, 584, 272.2

(56) References Cited

U.S. PATENT DOCUMENTS

| | | |
|---|---|---|
| 3,242,314 A | 3/1966 | Eckles |
| 3,392,259 A | 7/1968 | Meier |
| 3,464,534 A | 9/1969 | Muncheryan |
| 4,635,415 A | 1/1987 | Schumacher et al. |
| 4,743,091 A | 5/1988 | Gelbart |
| 4,804,975 A | 2/1989 | Yip |
| 4,808,789 A | 2/1989 | Muncheryan |
| 5,061,332 A | 10/1991 | Stolz et al. ................... 156/94 |
| 5,269,868 A * | 12/1993 | Gofuku et al. ............... 156/344 |
| 5,272,716 A * | 12/1993 | Soltz et al. ................... 372/109 |
| 5,423,931 A | 6/1995 | Inoue et al. |
| 5,468,238 A | 11/1995 | Mersch |
| 5,580,471 A | 12/1996 | Fukumoto et al. |
| 5,743,902 A * | 4/1998 | Trost ............................ 606/18 |
| 5,895,589 A * | 4/1999 | Rodgers et al. ......... 219/121.76 |

FOREIGN PATENT DOCUMENTS

| | | | |
|---|---|---|---|
| CA | 2073092 | 1/1993 | ............ F16J/15/10 |
| CN | 2073092 * | 1/1993 | ............ F16J/15/10 |
| DE | 4320341 | 12/1994 | |
| EP | 0185139 | 6/1986 | |
| EP | 0215960 | 4/1987 | |
| EP | 0217019 | 4/1987 | |
| EP | 0319023 | 12/1988 | ............ B29C/65/36 |
| EP | 0377376 | 12/1989 | ............ B60J/10/02 |
| EP | 0492786 | 8/1991 | .............. C09J/5/06 |
| EP | 0521825 | 1/1993 | |
| EP | 0603047 | 6/1994 | |
| EP | 0 762 409 A1 | 8/1996 | |
| FR | 8210473 | 6/1982 | ............ H06B/3/26 |
| JP | 820056691 | 10/1983 | ........... B29C/27/10 |
| JP | 7-155978 | 6/1995 | |
| JP | 11267627 * | 10/1999 | |
| RU | 1789150 | 1/1993 | |
| RU | 2008042 | 2/1994 | |
| WO | 96/17737 * | 6/1996 | .............. B60J/1/00 |

* cited by examiner

Primary Examiner—M. Alexandra Elve
(74) Attorney, Agent, or Firm—Merchant & Gould P.C.

(57) ABSTRACT

Glazing panels such as vehicle glazing panels bonded to a supporting frame are released by firstly arranging light energy delivery means adjacent the panel and subsequently transmitting light energy from the delivery means through the panel thereby to effect release of the panel from the frame. The light may be pulsed according to a predetermined regime and may be delivered by a discharge lamp having rapidly attenuating intensity. The mechanism of panel release may be by thermal degradation of the bonding material, cleavage of material at a surface of, or within the body of the panel, or a combination of such mechanisms.

42 Claims, 5 Drawing Sheets

RELEASING OF GLAZING PANELS

The present application is a Continuation-In-Part of U.S. patent application Ser. No. 09/184,186, filed Nov. 2, 1998, which is a Continuation-In-Part of U.S. patent application Ser. No. 09/133,854, filed Aug. 14, 1998, which is a continuation of U.S. patent application Ser. No. 08/693,060, filed Aug. 13, 1996.

FIELD OF THE INVENTION

The present invention relates to the releasing of glazing panels from supporting frames.

BACKGROUND OF THE INVENTION

Reference to glazing panels should be understood to mean panels, screens, or windows of glass, plastics or any other material substantially transparent to wavelengths in the visible range of the spectrum.

Vehicle windscreens typically comprise either toughened glazing panels or laminated panel structures (typically comprising an outer glass layer, an inner glass layer and an interlayer, interposed between the outer and inner glass layers). The glazing panel may be tinted depending on preference to absorb specific wavelengths (particularly U.V.). For laminated windscreens the interlayer is typically tinted.

WO-A-9617737 discloses a method and apparatus for releasing bonded transparent screens (typically vehicle windscreens) from supporting frames to which they are bonded. The technique described uses laser energy directed to effect release of a screen from a frame. The technique is useful in that the laser energy is directed from the laser head to the bonding bead/glazing panel interface. Problems exist however in ensuring the required energy for release is delivered without overheating occurring in the body of the glazing panel, and also due to the nature of high energy laser apparatus there are inherent health and safety implications.

An improved technique has now been devised.

SUMMARY OF THE INVENTION

According to a first aspect, the invention provides a method of releasing a glazing panel from a frame to which the panel is bonded by interposed bonding material, the method comprising:

i) arranging light energy delivery means adjacent the glazing panel; and, ii) operating the light energy delivery means to transmit light energy through the glazing panel to effect release of the glazing panel from the frame.

According to a second aspect the invention provides apparatus for releasing a glazing panel from a frame to which the panel is bonded by interposed bonding material, the apparatus comprising light energy delivery means arrangeable adjacent the glazing panel, and operable to transmit light energy through the glazing panel to effect release of the panel from the frame.

The light energy delivered is preferably of a wavelength substantially in the range 300 nm–1500 nm (more preferably in the range 400 nm–700 nm).

The light energy delivered is desirably pulsed according to a predetermined regime, preferably such that the pulse event duration (T on) is less than the inter-pulse interval (T off).

Desirably, a single pulse event of light energy delivered is of sufficient energy to effect separation of the glazing panel from the frame along a length of the bonding material.

The apparatus preferably includes a pulse forming network (which may include a capacitor and inductor arrangement) to drive the apparatus to produce a light pulse event. The apparatus preferably further comprises a trigger network for initiating operation of the pulse forming network.

Control means is preferably provided for controlling one or more apparatus parameters, preferably including the minimum permissible time elapsing between subsequent light pulse event. The control means is therefore preferably linked to the trigger network and/or the pulse forming network. A safety interlock is beneficially provided to reduce the risk of accidental initiation of a light pulse event. Preferred features of the safety interlock firing feature are described herein and in the appended claims.

It is preferred that means is provided for selectively adjusting the intensity of the light delivered. This is important in view of the differing degree to which various tinted glazing panels absorb light energy in the wavelength range contemplated. It is preferred that the apparatus includes different preset parameter settings which may be switched dependent upon the glazing panel tint to be de-bonded.

The light energy may be absorbed at the bonding material/panel interface either by the bonding material itself, or by an absorbing layer comprising the panel (such as the frit layer commonly found on vehicle glazing panels) or by a suitable light absorbent coating provided at the interface.

The light energy delivery means may be tracked about the periphery of the glazing panel, preferably at a predetermined rate dependent upon the power of the light energy delivery means and the pulse regime. Tracking means (preferably motorised tracking means) may be provided for this purpose.

Alternatively, the light energy delivery means may be hand held and positioned on the glazing manually by an operator. The delivery means may therefore have a manual trigger for initiating a light pulse when the delivery head is positioned to the operators satisfaction.

The apparatus preferably includes a safety interlock requiring at least two input devices to be actuated before light energy can be delivered from the delivery means. One of the input devices comprising the interlock may include the (main) manual trigger.

The apparatus preferably includes a delivery head (desirably carrying a light emitting device) from which the light energy is delivered, the delivery head beneficially including at least two input devices comprising the safety interlock, both input devices on the delivery head requiring actuation in order to enable light energy to be delivered from the delivery means.

The input devices comprising the safety interlock preferably comprise electrical input devices (such as switch means). Following actuation, the input devices comprising the interlock are preferably reset to a non-actuation state.

In one embodiment, the light energy delivered comprises a plurality of wavelengths, most preferably in the visible range of the spectrum. In one embodiment, it is preferred that the light energy is non-coherent. The light energy preferably attenuates rapidly with distance such that at a few centimeters (preferably less than 10 cm, more preferably less than 5 cm) from the energy delivery means the light energy density is significantly diminished from its maximum value (preferably falling to 50% maximum value or below).

The pulse regime is controlled, preferably such that a following light pulse event is inhibited in the circumstances that a preceding light pulse occurred within a predetermined time period. This prevents the apparatus being operated too rapidly (which may cause overheating of the glazing panel and or the gas discharge tubes). If the trigger (or other actuator) is held by the operator permanently actuated, the apparatus control provides that a series of pulse events are initiated at a predetermined time interval (typically greater than the minimum permitted time interval). The predetermined time interval is set by the control means and is dependent upon the discharge energy level set. Typically the predetermined time interval for 'continual' actuation in substantially in the range 0.5–5 s (more preferably 1–3 s). The higher is the pulse discharge energy set the longer is the minimum permitted interval and also the set level of the predetermined time interval for 'continual' actuation.

Desirably, the pulse regime is controlled such that a following light pulse event is inhibited if the time elapsing after a preceding light pulse event is greater than a predetermined time. This ensures that the device may not accidentally be left in an operable condition following use for a series of pulse events. The apparatus, for example may revert to a "standby" mode.

The energy delivered is preferably substantially in the range 100 Joules–10,000 Joules per pulse (more preferably in the range 500–1500 Joules per pulse). The pulse duration (T on) is preferably substantially in the range 1 $\mu$s–100 ms, more preferably 1 ms–2 ms.

In a preferred embodiment, the energy delivery means comprises electrical gas discharge apparatus. Desirably, operation of the gas discharge apparatus is controlled to limit the pulse rate and/or duration of the light pulse.

The operation of the gas discharge apparatus is preferably controlled by:
  i) charging a capacitor arrangement;
  ii) initiating a trigger pulse to discharge the capacitor arrangement; and,
  iii) discharging the capacitor arrangement through an inductor to the gas discharge apparatus.
Accordingly, for this preferred embodiment, apparatus according to the invention includes energy delivery means comprising electrical gas discharge apparatus.

The electrical gas discharge apparatus is controlled to limit the pulse rate of the light delivered. The apparatus preferably includes a pulse forming network having a capacitor and inductor arrangement in which the capacitor discharges through the inductor to drive the electrical gas discharge apparatus to produce a light pulse. The apparatus preferably further comprises a trigger network for initiating the capacitor of the pulse forming network to discharge.

Control means is preferably provided for controlling one or more apparatus parameters including the minimum permissible time elapsing between subsequent discharge pulses of the electrical gas discharge apparatus.

The electrical gas discharge apparatus preferably comprises an electrical gas discharge tube.

The electrical gas discharge apparatus desirably comprises a reflector (preferably a parabolic reflector) arranged to direct emitted light in a predetermined direction. The reflector preferably includes a reflective coating of a heat resistant material, preferably comprising a silver material.

The apparatus preferably includes a window through which emmited light is directed to pass through the glazing panel. The window may be omitted from the apparatus, and omitting the window has been found to beneficially aid in cooling of the light emitting devices (discharge tubes).

Desirably, the apparatus includes an edge guide (preferably "snap fit" releasable) arrangement to locate against a peripheral edge of the glazing panel. The edge guide assists an operator in manually positioning the apparatus correctly with respect to the bonding bead securing the glazing panel.

The apparatus may comprise focussing means arranged to focus the light energy at a predetermined location.

In one embodiment, the tracking and pulsed operation of the light energy delivery means may be coordinated such that subsequent light pulses overlap spatially a relevant portion of the glazing panel. Operation in this manner ensures good separation of the panel from the frame at the bonding material/panel inner layer interface.

It has been found that for glazing panels (particularly those including a tinted interlayer) operation of the light energy delivery means in pulsed mode provides benefits, because energy absorption in the body of the screen or panel (particularly at the interlayer of laminated glazing panels) is minimised.

In a preferred embodiment the apparatus comprises:
  i) a light energy delivery head including an electrically operable light emitting element;
  ii) a base unit remote from the delivery head, the base unit including electrical power supply for the light emitting element of the delivery head; and,
  iii) flexible umbilical extending between the base unit and the delivery head permitting connection of the delivery head to the base unit.

The invention will now be further described in specific embodiments by way of example only and with reference to the accompanying drawings.

DETAILED DESCRIPTION OF THE PREFERRED EMBODIMENTS

In the application shown, the apparatus 1 is used to release a vehicular glazing panel (windscreen 16) from a supporting frame 7 to which it is bonded by an interposed, dark coloured polyurethane bonding bead 8 which extends around the entire periphery of the panel 16 in contact with frame 7.

The windscreen panel 16 comprises an outer glass layer 9, an inner glass layer 10 and intermediately therebetween, an interlayer 11 comprising a tinted sheet material which is transparent to certain wavelengths of visible light but opaque to others and also to ultra violet (U.V.) radiation. The purpose of the interlayer 11 is to provide structural strength for the windscreen 16 such that in the event of impact the screen remains intact, and also to provide a U.V. barrier.

Immediately adjacent the bonding bead 8, the periphery of the inner layer 10 of the windscreen panel 16 is provided with a bonded glass frit layer 12 which is typically dark in colour (more typically black in colour). The purpose of the frit layer is to inhibit the passage of ultra-violet radiation through the screen to impinge upon the polyurethane bonding bead 8 which is typically degradable upon exposure to UV radiation.

Although described in the specific embodiments in relation to a laminated windscreen, the invention is equally suitable for use in relation to other similarly bonded glazing panels such as "toughened" vehicle glazing panels etc.

Figure 1:
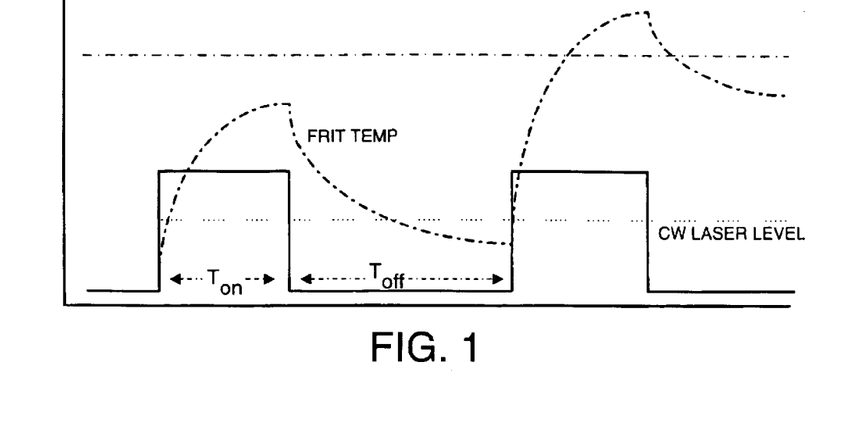
FIG. 1 is a diagrammatic representation showing pulsed light operation of the light energy and the effect on glazing panel and frit temperature.
Figure 2:
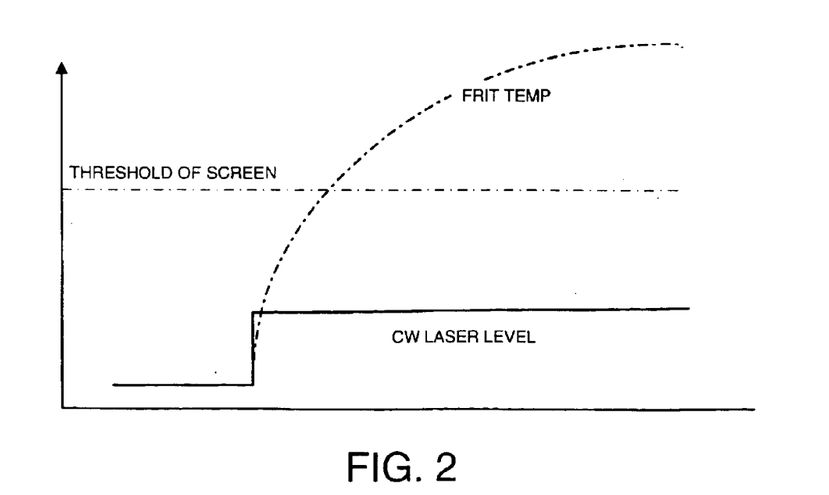
FIG. 2 is a representation similar to that shown in FIG. 1 showing prior art continuous wave laser radiation and the effect on frit and glazing panel temperature.

FIGS. 1 and 2 compare light pulsed in accordance with the preferred pulsing regime of the present invention (which will be described in detail hereafter), with continuous wave laser operation known from the prior art system disclosed in WO-A-9617737, and the associated effect on the temperature of the frit layer 12 in relation to threshold of glazing panel integrity (particularly delamination at the panel interlayer 11 for a laminated windscreen panel).

The use of continuous wave laser radiation results in excess heat build-up within the body of the panel 16, (particularly at the interlayer 11 for laminated screens). This has the effect that increased power is required than would be the case where significant heat build up does not occur within the body of panel 16. Furthermore, the heat build-up within the body of panel 16 has been found to result in glass fracture in the body of the glazing panel (or at interlayer 11 for laminated screens). This increases the energy absorption within the body of panel 16 leading to a "chain event" in which increasingly greater amounts of energy delivered is absorbed within the body of the panel 16. This results in less energy reaching the frit layer 12/bonding bead 8 interface, thereby reducing the effectiveness of the separation.

This over absorption within the body of the glazing panel can also occur for non-laminated windscreens such as 'toughened glass' windscreen glazing panels (particularly where tinted). A further problem with a laser system as disclosed in the prior art is that use of powerful laser apparatus is largely unsupervised situations has serious health and safety implications. Furthermore laser systems and apparatus tend to be relatively expensive.

The use of pulsed light operation enables a burst of energy to be delivered to the frit layer 12/bonding bead 8 interface in a sufficiently short time to ensure enough energy for release is absorbed at the bonding bead 8/frit layer 12 interface without detrimental heat build up in the body of the glazing panel 16. Sufficient energy for localised release of the glazing panel may be delivered in a single pulse burst; alternatively repeated successive pulses/bursts may be preferable, particularly with more darkly tinted glazing panels. Where successive pulses/bursts are utilised sufficient time between pulsed energy bursts (T off) is provided to allow heat absorbed within the body of the glazing panel (including at interlayer 11) to be dissipated. The use of non-collimated light facilitates rapid attenuation of energy with distance from the apparatus and makes the apparatus more suitable from a health and safety point of view.

Figure 3:
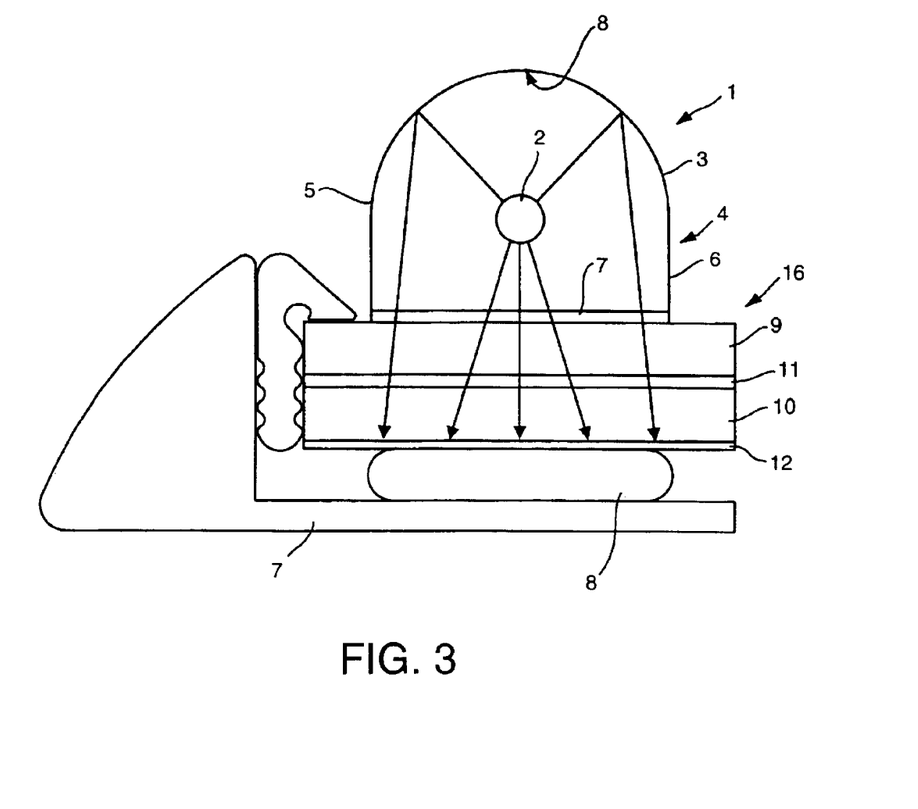
FIG. 3 is a schematic representation of a first embodiment of light energy delivery means according to the invention.

Referring to FIG. 3, the apparatus generally designated 1 comprises a delivery head 4 including an electric gas discharge tube 2 containing a high pressure Noble/inert gas such as Xenon or Krypton. The discharge tube operates to produce an output burst of light of a range of wavelengths in the visible spectrum (approximately in the range 400 nm to 700 nm). The energy delivered, per pulse is typically in the range 500–1500 Joules however the energy disipates (attenuates) rapidly with distance from the tube. (This is an important operational aspect, as will be described further below).

A housing/casing 3 surrounds the discharge tube and includes shielding sidewalls 5,6 and a spanning visible light transmissible window 7. A parabolic reflector wall 8 is positioned opposite the window 7 to reflect light from the reverse side of discharge tube 2 to pass through the window 7. The reflector wall 8 is provided with a heat resistant reflective coating typically of a material including a silver material.

In use, the optical delivery head is positioned as shown in FIG. 3 and a manually actuatable trigger is operated to produce a single light pulse which passes through the screen 6 and is absorbed at the frit layer 12 and/or the bonding bead 8. The frit 12 or bonding bead rapidly heats up and separates from the screen typically either by glass ablation, temperature carbonisation of the bead 8, or other thermal mechanisms. Typically a single shot/pulse is sufficient to effect release over a length of screen approximating to the length of the discharge tube 2 (typically 5–15 cm) although multiple shots may be used (for example at lower power to minimise frit damage, or where the screen is darkly tinted). In a typical system an energy footprint of 5 cm×2 cm is projected onto the glazing panel. The operator then moves on to an adjacent portion of the screen periphery before instigating a further light pulse. The procedure is repeated about the entire perimeter of the panel to effect complete release.

Figure 4:
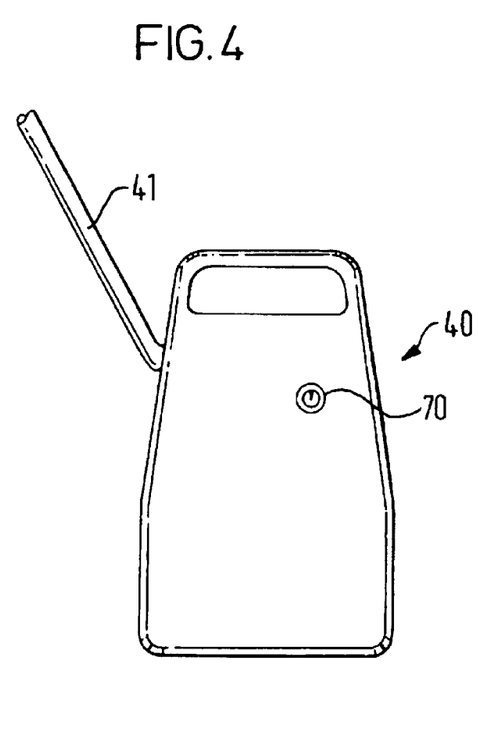
FIG. 4 is a perspective view of a preferred embodiment of apparatus according to the invention.
Figure 5:
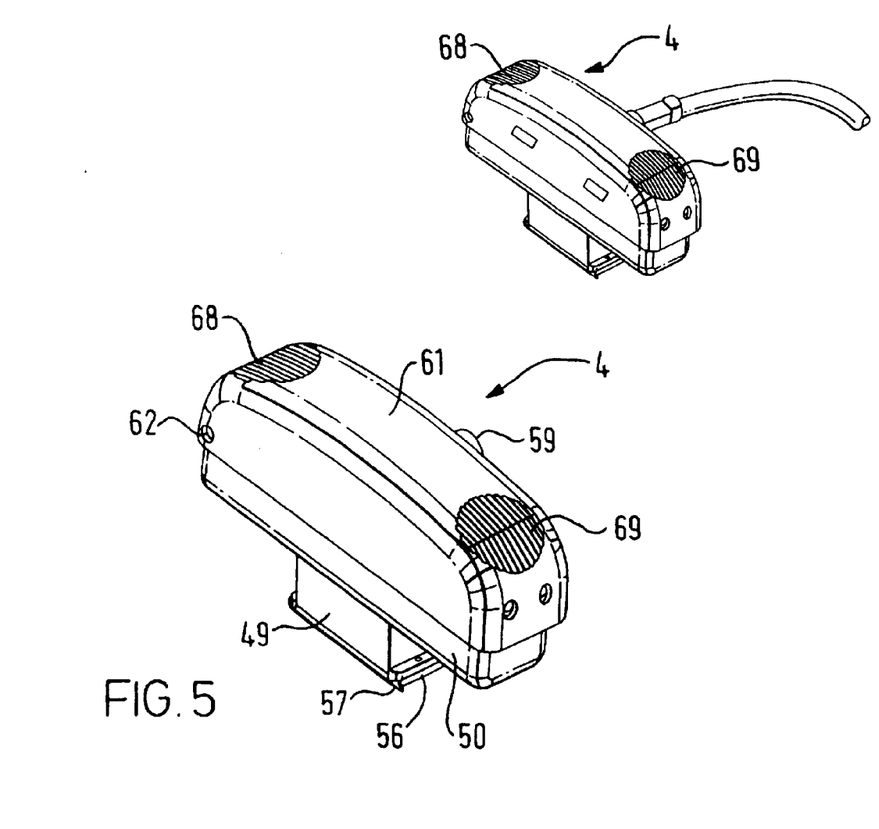
FIG. 5 is a perspective view of the light energy delivery head of the apparatus of FIG. 4.
Figure 6:
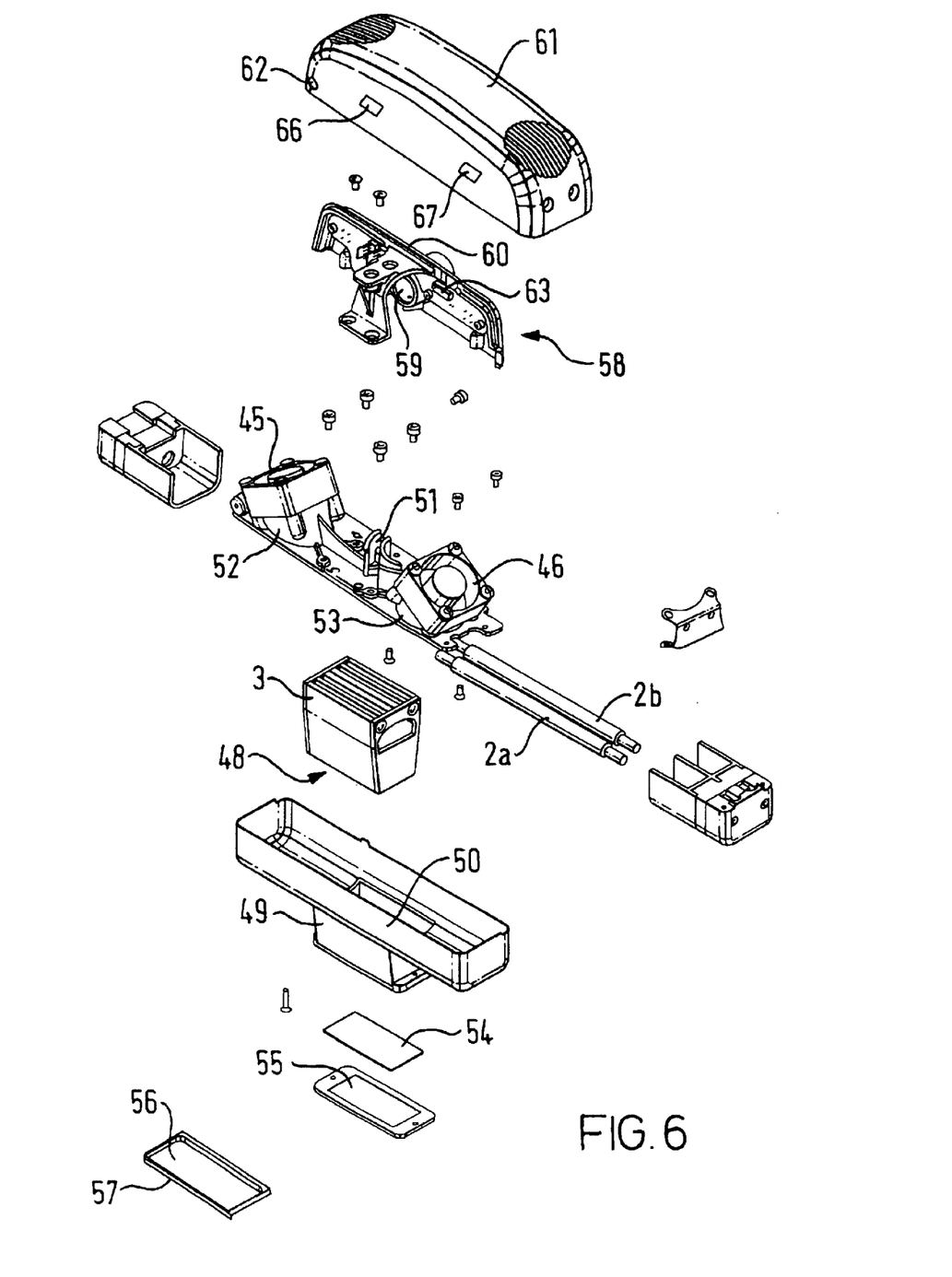
FIG. 6 is a perspective assembly view of the head of FIG. 5.

In the preferred arrangement (as shown in FIGS. 4 to 6) the delivery head 4 is connected to a base unit 40 by an umbilical 41. Base unit 40 includes the power supply and control system 29 for operation of the apparatus, including the trigger network 30, pulse forming network 31 capacitor bank 32 inductor 34 and capacitor charging power supply 33. The power supply and control system are described in detail below in relation to FIGS. 7 to 9. The umbilical 41 includes the electrical cabling to supply electrical power to the components of the illuminating head 4, including the flashlamp discharge tubes 2a,2b and cooling fans 45,46.

As shown in FIG. 6, the head includes a pair of flashlamps (electrical gas discharge tubes) 2a,2b arranged in parallel (but connected electrically in series) extending between end connectors 47,48 and passing through apertures 47,48 in housing 3. The provision of the flashlamps 2a,2b in parallel ensures that the required light energy is deliverable to effect release of the glazing panel and also improves thermal/electrical efficiency. Typically a system using tubes in parallel arrangement (connected electrically in series) can provide between 20,000 to 1 million pulse events (depending upon panel tint); a single tube would enable only approximately 200–500 pulse events before failure. Electrical connection in series improves provides optimum capacitor usage because the charge passes in series sequentially through the series connected tubes.

The internal walls of housing 3 are coated in a reflective heat resistant material (typically including a silver material) and define a curved reflector surface arranged to reflect the light from flashlamps 2a,2b downwardly through the open end 48 of housing 3. The housing 3 is received in a sheath 49 protruding from a lower casing portion 50. The lowermost extent of protruding sheath 49 is fitted with a quartz window 54 secured by an apertured fitment plate 55. The window 54 permits the illuminating light generated by flashlamps 2a,2b to pass out of housing 3. The underside of fitment plate 55 is fitted with a "snap fit" removable apertured plate 56 which includes a projecting longitudinal peripheral lip 57. Lip 57 serves as an edge guide, locating against the peripheral edge of the glazing panel and aiding in positioning the head in the correct position with respect to the bonding bead 8.

The upper portion of housing 3 is secured to a casting 51 which at opposed ends seats cooling fans 45,46 in respective angled ducts 52,53 to direct cooling air to cool the flashlamp tubes 2a,2b. Cooling of the flashlamp tubes is important in order to maximise the tube life. Typically flashlamp tubes (for other applications) are water cooled. Water cooling would be impractical for the apparatus of the present invention because the illumination head needs to be relatively lightweight and manoeuvrable for operator handling. The umbilical 41 would become too cumbersome if it were necessary to carry cooling water to the head and the head would be unwieldy if a water cooling jacket filled with cooling water were incorporated into the head design. Furthermore cooling water present in the head would be likely to absorb a portion of the useful light energy emitted from flash lamp tubes 2a,2b. The arrangement of the cooling fans, lamp tubes in parallel, and reflector are considered to be important, novel and inventive aspects of the design both individually and in combination.

A casting 58 is secured to the casting 58, extending upwardly therefrom. Casting 58 includes a hollow boss 59 to which the umbilical 41 is secured and includes an upper elongate edge 60. A shell moulded cap 61 is pivotally secured at one end (pivot mounting 62) to the upwardly extending casting 58. Cap 63 includes spaced vents 68,69 permitting fans 45,46 to draw air into the interior of the apparatus.

When downward manual pressure is applied to the cap 61, slight pivotal 'closing' movement of the cap relative to the casting 58 (against a biassing spring—not shown) occurs resulting in engagement of an internal formation provided on cap 61 with a limit switch 63 carried by the casting 58. As a result the limit switch closes. The control system 29 is configured to inhibit firing of a flashlamp pulse unless the limit switch 63 is closed. In this way, the limit switch 63 and pivotal cap 61 arrangement acts as a safety interlock preventing firing of the flashlamp unless predetermined conditions are satisfied (in this case unless sufficient pressure is applied to the cap 61). Even with the interlock overridden, an external switch 66 on the cap 61 must be actuated before the control system 29 initiates the flashlamp firing sequence. The interlock arrangement therefore requires at least two input signals to be passed to the control system 29 before a flashlamp pulse can be triggered. Other envisaged interlocks could, for example comprise a pressure or other sensor arranged on the head to detect contact with the glazing panel, and/or a second confirmatory manually actuatable switch 67 provided on the casing (both switches needing to be actuated for the flashlamp firing sequence to be initiated).

It has been found that significantly improved results are achieved where the light delivered is in the visible range of the spectrum, and the light is pulsed according to a regime in which a series of discrete pulses of light are transmitted, the pulse duration (T on) being substantially in the range 1 $\mu$s to 100 ms (more preferably in the range 1 ms–2 ms) and the pulse repetition frequency being substantially in the range 0.1 Hz–10 Hz (more preferably in the range 0.3 Hz–1 Hz).

Use of the pulsing regime described herein and lower wavelengths of light (in the visible spectrum) have been found to provide significantly enhanced results in which a greater proportion of the energy delivery is concentrated at the frit layer 12/bonding bead 8 interface, and excess heat build-up (and associated glass fracture) at interlayer 11 is avoided or at least ameliorated.

The delivery head 4 is used to deliver light energy through the glazing panel in order for energy to be concentrated at the frit layer 12. Separation of the panel 6 from the frame 7 is effected as a result of energy absorption at the frit layer 12/bonding bead 8 interface resulting in rapid heating and either cleavage or degradation of the frit material 12 comprising the panel 6, or degradation of material comprising the bonding bead 8 (or degradation of a primer coat applied to the glazing panel prior to installation in contact with the bonding bead). The release mechanism may comprise a combination of the mechanisms described.

Figure 7:
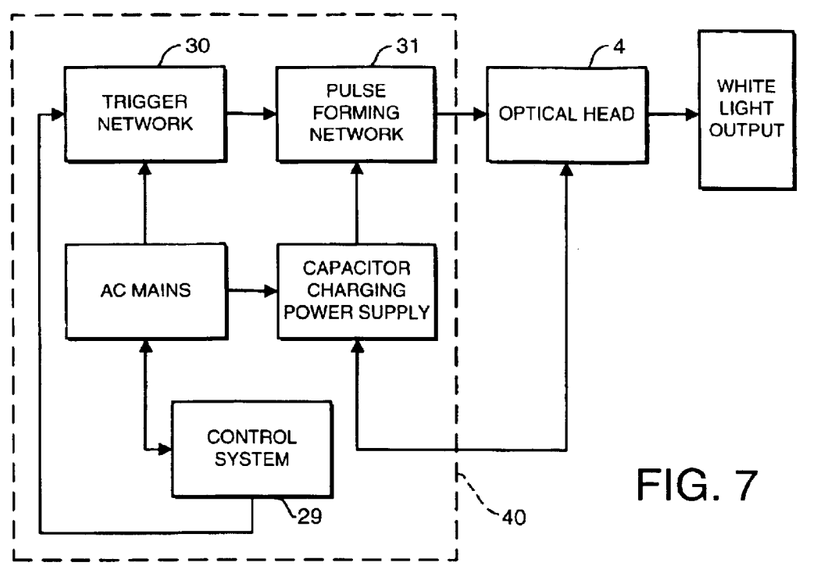
FIG. 7 is a system diagram of a apparatus including the light energy delivery means of the preceding figures.

Referring to FIG. 7, the tubes 2a,2b are controlled to produce high intensity pulses according to a predetermined pulse regime by means of control unit 29 operating to appropriate programmed instructions in conjunction with the manual trigger. Control unit 29, controls the operation of a trigger network 30 to activate a pulse forming network 31 to supply current to the tubes 2a,2b (in accordance with the 'interlock' arrangement mentioned above) to produce a light pulse having the desired characteristics.

A further feature of the apparatus is that a so called "simmer circuit" is used to supply a substantially continuous leakage/trickle current to the flashlamps 2a or 2b when the apparatus is on or in "standby" mode. This prevents capacitor overcharge and prolongs flashlamp life. "Simmer circuits" are known from gas discharge apparatus in general. A unique feature of the present arrangement is that the trickle/seepage current is used as a safety feature because the current drawn by the flashlamps 2a, 2b is continuously monitored (by the control unit 29), the current supply to the flashlamps 2a, 2b being cut off if no current is drawn (due to lamp failure or breakage).

Figure 8:
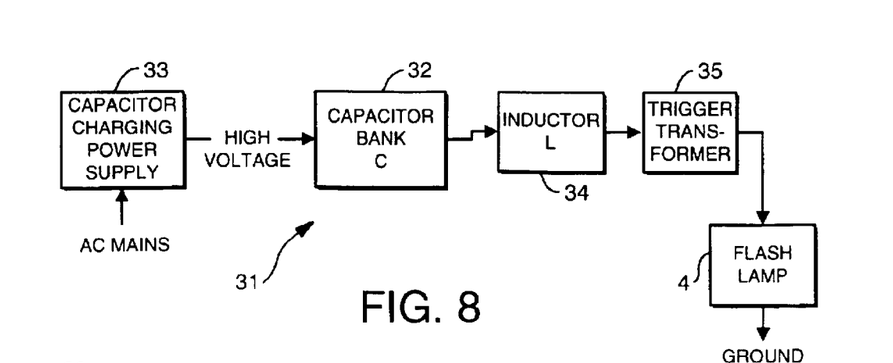
FIG. 8 is a block diagram of the pulse forming network of the system shown in FIG. 7.
Figure 9:
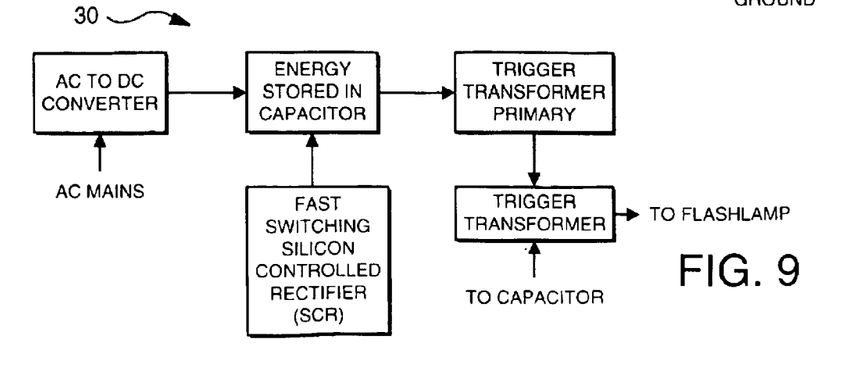
FIG. 9 is a block diagram of the trigger network of the system shown in FIG. 7.

Referring to FIG. 8, the pulse forming network 31 includes a capacitor bank 32 charged to a preset voltage by a power supply 33. The capacitor bank 32 remains charged until a trigger pulse from the trigger network initiates discharge in the discharge tube 2, when charge stored in capacitor bank 32 discharges through inductor 34 and a secondary trigger transformer 35, to the tube 2. The time constant of the discharge (and hence the light pulse duration and "profile") is determined by the values of the inductor 34 and capacitor bank 32. For an operational system a pulse duration of 1 ms–2 ms has been found to be suitable. For present purposes, pulse duration should be understood to be the time interval between the light power reaching half its maximum value and subsequently falling to half its maximum value. The required pulse duration varies depending upon the optical properties of the glazing panel to be released. For example different glazing tints require different levels of energy to be supplied to effect release, and hence different power levels. The capacitor bank 32 and inductor 34 can therefore be reset to appropriate values depending upon the glazing panel to be released in order to modify the "profile" and power of the pulse delivered. Manually or automatically selectable controls 70 on the base unit 40 permit the output energy and/or pulse duration of the flash tubes 2a,2b to be modified according to the tint of the object glazing panel. The apparatus may be provided with preset settings selectable by the operator (or automatically) appropriate to common glazing tints or other known variables. To adjust the optical power of the apparatus the capacitor charging power supply may be varied.

The pulse repetition frequency (corresponding to the length of the inter-pulse interval (T off)) is important to ensure that the period between successive pulses is sufficient to allow the heat absorbed in the thickness of the screen to dissipate before more energy is delivered. Additionally overheating of the lamp tubes 2a,2b is ameliorated by this means and lamp life enhanced. The control unit 29 acts to override the manual trigger to inhibit the trigger network 30 from initiating discharge until the required time period has elapsed. The minimum interval between firing typically controlled to be in the range 0.3 Hz–1 Hz. A maximum interval between firing is also set by the control system, typically in the range 10–20 seconds or above. If the operator does not fire the flash tubes until after the maximum interval has passed from the preceding firing, the control system automatically discharges the capacitor arrangement to ground and switches the power supply to a standby mode; thereafter the power supply on the base unit 40 must be set to an 'active' mode before the apparatus will operate. The maximum time delay 'time out' feature ensures that the apparatus cannot be left in an operational mode accidentally following use. This is an important safety feature of using this embodiment.

The energy delivered per light pulse is selected according to the tint or other qualities of the glazing panel but typically varies between 500–1500 Joules per pulse. Because non-laser light is used, the energy attenuates rapidly with distance from the optical head 4 and is therefore sufficient to effect debonding of the glazing panel but less susceptible to unauthorised or accidental operator misuse. This is an important safety feature of using this embodiment.

In one embodiment, the delivery head 4 may be carried by a motorised tracking system (not shown) arranged to track the head 4 about the entire periphery of glazing panel 6 to effect complete release of the panel 6 from frame 7. The operation of the tracking system 4 and light energy delivery by head 4 are co-ordinated (by control means—not shown) such that the speed of tracking about the frame is maintained at a predetermined rate.

For optimum performance it is preferred that subsequent pulses of the pulsed light overlap spatially.

We claim:

1. A method of releasing a glazing panel from a frame to which the panel is bonded by interposed bonding material, the method comprising:
   i) arranging a pulsable light energy delivery apparatus adjacent the glazing panel; and
   ii) operating the light energy delivery apparatus to transmit pulsed light energy comprising at least one light pulse event through the glazing panel to effect release of the glazing panel from the frame, wherein the light energy delivery apparatus is controlled to inhibit a following light pulse event if the time elapsing after a preceding light pulse event is less than a predetermined time or greater than a predetermined time.

2. A method according to claim 1, wherein the light energy delivered is of a wavelength substantially in the range 300 nm–1500 nm.

3. A method according to claim 2, wherein the light energy delivered is of a wavelength substantially in the range 400 nm–700 nm.

4. A method according to claim 1, wherein the light energy delivered comprises a plurality of wavelengths.

5. A method according to claim 1, wherein the light energy attenuates significantly with distance such that at a few centimeters from the energy delivery apparatus the light energy density is significantly diminished from its maximum value.

6. A method according to claim 5, wherein at a distance substantially in the range 5 cm or less from the delivery apparatus the light energy density is 50% maximum value, or below.

7. A method according to claim 1, wherein the light energy is non-coherent.

8. A method according to claim 1, wherein the light energy delivered is pulsed according to a predetermined regime.

9. A method according to claim 8, wherein the pulse duration (T on) of the light pulse event is substantially in the range 11 s–100 ms.

10. A method according to claim 9, wherein the pulse duration of the light pulse event is substantially in the range 1 ms–2 ms.

11. A method according to claim 1, wherein the pulse duration (T on) is less than a minimum permissible inter-pulse interval (T off).

12. A method according to claim 8, wherein a single pulse of light energy delivered is of sufficient energy to effect separation of the glazing panel from the frame along a length of the bonding material.

13. A method according to claim 1, wherein the light energy delivery apparatus is sized to enable it to be hand held and positionable relative to the glazing panel manually by an operator.

14. A method according to claim 1, wherein the energy delivery apparatus comprises electrical gas discharge apparatus.

15. A method according to claim 14, wherein operation of the gas discharge apparatus is controlled to limit either one of the pulse rate or duration of the light pulse.

16. A method according to claim 15, wherein the operation of the gas discharge apparatus is controlled by:
   i) charging a capacitor arrangement;
   ii) initiating a trigger pulse to discharge the capacitor arrangement; and,
   ii) discharging the capacitor arrangement through an inductor to the gas discharge apparatus.

17. A method according to claim 15, wherein the gas discharge apparatus is fed with a current at times other than during a pulse event.

18. A method according to claim 17, wherein the current is monitored to provide an indication of the operability of the gas discharge apparatus.

19. Apparatus for releasing a glazing panel from a frame to which the panel is bonded by interposed bonding material, the apparatus comprising:
   a light energy delivery head arrangeable adjacent the glazing panel, said delivery head including an electrically operable light emitting element that is operable to transmit non-laser, pulsed light energy comprising at least one light pulse event through the glazing panel to effect release of the panel from the frame;
   a base unit remote from the delivery head, the base unit including a supply of electrical power for the light emitting element of the delivery head; and
   a flexible umbilical extending between and connecting the base unit and the delivery head.

20. Apparatus according to claim 19, further including a control system to either one of adjust or limit at least one of:
   the pulse repetition rate of successive light pulse events;
   the duration of the light pulse event; and
   the intensity of the light delivered.

21. Apparatus according to claim 19, including a control system for controlling one or more apparatus parameters including the minimum permissible time elapsing between subsequent pulse events of the light emitting element.

22. Apparatus according to claim 19, wherein the delivery head includes a manual trigger for initiating a light pulse.

23. Apparatus according to claim 19, wherein the apparatus includes a safety interlock comprising at least two input devices that must be actuated before light energy can be output from the light emitting element.

24. Apparatus according to claim 23, wherein the delivery head includes the at least two input devices.

25. Apparatus according to claim 23, wherein the input devices comprise switches.

26. Apparatus according to claim 23, wherein following actuation the input devices are reset to a non-actuation state.

27. Apparatus according to claim 19, wherein a controller is provided for selectively adjusting the intensity of the light delivered.

28. Apparatus according to claim 19, wherein the apparatus includes different present settings which may be switched to adjust one or more parameters of the light energy delivered.

29. Apparatus according to claim 28, wherein adjustable light energy parameters include:
light intensity; and/or,
pulse duration; and/or
pulse interval.

30. Apparatus according to claim 19, wherein the light emitting element comprises an electrical gas discharge device.

31. Apparatus according to claim 30, wherein the electrical discharge device includes a light emitting discharge tube.

32. Apparatus according to claim 31, wherein the electrical gas discharge device includes a pair of light emitting discharge tubes arranged in side by side relationship.

33. Apparatus according to claim 19, further comprising cooling means for cooling the light emitting element.

34. Apparatus according to claim 33, wherein the cooling means comprises at least one electrically operated fan.

35. Apparatus according to claim 30, including a pulse forming network having a capacitor and inductor arrangement in which the capacitor discharges through the inductor to drive the electrical gas discharge device to produce a light pulse.

36. Apparatus according to claim 35, including a trigger network for initiating the capacitor of the pulse forming network to discharge.

37. Apparatus according to claim 19, further including a reflector associated with the delivery head arranged to direct emitted light in a predetermined direction.

38. Apparatus according to claim 19, wherein the delivery head comprises a window through which emitted light is directed.

39. Apparatus according to claim 19, wherein the delivery head comprises an edge guide arranged to locate against a running edge of the glazing panel.

40. Apparatus according to claim 19, wherein the light emitting element of the delivery head comprises an electrical gas discharge light emitting device, and the base unit includes an electrical power arrangement having a capacitor for discharging through the electrical gas discharge light emitting device in the head via the umbilical.

41. A method of releasing a glazing panel from a frame to which the glazing panel is bonded by interposed bonding material, the method comprising the steps of:
directing at least one non-laser light output pulse from a non-laser flashlamp via an optical delivery head at a wavelength to be absorbed by either one of the bonding material or a frit layer on an inside face of the glazing panel about a periphery thereof and conforming to the frame;
moving the optical delivery head to adjacent portions of the glazing panel along a path of either one of the frit layer or the bonding material; and
repeating the at least one light pulse to effect release of the glazing panel from the frame.

42. A glazing panel releaser for releasing a glazing panel from a frame to which the glazing panel is bonded by interposed bonding material, said glazing panel releaser comprising:
an optical delivery head to direct light at either one of the bonding material or a frit layer on a inside face of the glazing panel about a periphery thereof and conforming to the frame; and
at least one non-laser flashlamp operable to produce the light directed by said optical delivery head in the form of at least one non-laser light pulse at a wavelength to be absorbed by either one of the frit layer or the bonding material to effect release of the glazing panel from the frame.

* * * * *